US010166742B2

(12) United States Patent
Gauriat et al.

(10) Patent No.: US 10,166,742 B2
(45) Date of Patent: Jan. 1, 2019

(54) METAL-POLYAMIDE/POLYETHYLENE-METAL LAMINATE

(75) Inventors: Antoine Gauriat, Bourg la Reine (FR); Cédric Calvez, Noisy le Grand (FR); Francis Schmit, Ansacq (FR); Cetin Nazikkol, Duisbourg (DE); Christoph Filthaut, Dortmund (DE); Roland Herd Smith, Brigancourt (FR); Jiri Pac, Brno (CZ)

(73) Assignees: USINOR, Puteaux (FR); THYSSEN KRUPP STAHL AG, Dusseldorf (DE)

( * ) Notice: Subject to any disclaimer, the term of this patent is extended or adjusted under 35 U.S.C. 154(b) by 54 days.

(21) Appl. No.: 10/562,005

(22) PCT Filed: Aug. 4, 2004

(86) PCT No.: PCT/IB2004/002501
§ 371 (c)(1),
(2), (4) Date: Dec. 23, 2005

(87) PCT Pub. No.: WO2005/014278
PCT Pub. Date: Feb. 17, 2005

(65) Prior Publication Data
US 2006/0269701 A1  Nov. 30, 2006

(30) Foreign Application Priority Data

Aug. 7, 2003 (EP) ..................................... 03291981

(51) Int. Cl.
| | | |
|---|---|---|
| *B32B 15/04* | (2006.01) | |
| *B32B 7/12* | (2006.01) | |
| *C09J 151/06* | (2006.01) | |
| *B32B 15/08* | (2006.01) | |
| *C08L 51/06* | (2006.01) | |
| *C08F 255/02* | (2006.01) | |
| *C09J 177/00* | (2006.01) | |
| *C09J 177/06* | (2006.01) | |
| *B32B 37/12* | (2006.01) | |
| *C08L 77/00* | (2006.01) | |
| *C08L 63/00* | (2006.01) | |
| *C09J 177/02* | (2006.01) | |
| *E04C 2/08* | (2006.01) | |

(52) U.S. Cl.
CPC .............. *B32B 15/043* (2013.01); *B32B 7/12* (2013.01); *B32B 15/08* (2013.01); *B32B 37/12* (2013.01); *C08F 255/02* (2013.01); *C08L 51/06* (2013.01); *C09J 151/06* (2013.01); *C09J 177/00* (2013.01); *C09J 177/02* (2013.01); *C09J 177/06* (2013.01); *E04C 2/08* (2013.01); *B32B 2311/00* (2013.01); *B32B 2311/24* (2013.01); *B32B 2311/30* (2013.01); *C08L 63/00* (2013.01); *C08L 77/00* (2013.01); *C08L 2666/02* (2013.01); *C08L 2666/14* (2013.01); *C08L 2666/24* (2013.01); *Y10T 428/31522* (2015.04); *Y10T 428/31681* (2015.04); *Y10T 428/31699* (2015.04)

(58) Field of Classification Search
CPC ......... B32B 15/043; B32B 7/12; B32B 15/08; B32B 37/12; B32B 2311/00; B32B 2311/24; B32B 2311/30; C08F 255/02; C08L 51/06; C09J 151/06; C09J 177/00; C09J 177/02; C09J 177/06; E04C 2/08
USPC ....................................................... 428/458
See application file for complete search history.

(56) References Cited

U.S. PATENT DOCUMENTS

| | | | | |
|---|---|---|---|---|
| 3,966,839 | A * | 6/1976 | Sims .................. C08L 77/00 | |
| | | | | 525/167 |
| 4,048,355 | A | 9/1977 | Sakayori et al. | |
| 4,421,892 | A * | 12/1983 | Kasahara et al. ............ 524/514 | |
| 4,429,076 | A * | 1/1984 | Saito et al. ..................... 525/57 | |
| 4,601,941 | A | 7/1986 | Lutz et al. | |
| 4,690,856 | A * | 9/1987 | Ito et al. ........................ 428/215 | |
| 5,047,479 | A * | 9/1991 | Ohmae et al. ................ 525/183 | |
| 5,210,134 | A * | 5/1993 | Akkapeddi ........... C08F 257/02 | |
| | | | | 525/166 |
| 5,216,075 | A * | 6/1993 | Papazoglou .................... 525/66 | |
| 5,278,231 | A * | 1/1994 | Chundury ....................... 525/66 | |
| 5,548,027 | A | 8/1996 | Heucher et al. | |
| 5,939,512 | A * | 8/1999 | Gervasi et al. .............. 528/170 | |
| 6,114,454 | A * | 9/2000 | Blanchard ................ C09C 1/28 | |
| | | | | 524/423 |

FOREIGN PATENT DOCUMENTS

| | | |
|---|---|---|
| DE | 100 11 589 A1 | 9/2001 |
| EP | 0 354 521 A2 | 2/1990 |

* cited by examiner

*Primary Examiner* — Kevin R Kruer
(74) *Attorney, Agent, or Firm* — Sughrue Mion, PLLC

(57) ABSTRACT

The invention concerns a metal laminate comprising between two outer metal sheets an adhesive polymer layer, characterized in that the adhesive polymer layer comprises polyamide, a copolymer of ethylene and an unsaturated carboxylic acid and/or a derivative thereof and a reactive copolymer. The invention further concerns a process for the manufacture of such a metal laminate and the use of such metal laminates for the manufacture of automotive body parts.

21 Claims, No Drawings

METAL-POLYAMIDE/POLYETHYLENE-METAL LAMINATE

CROSS-REFERENCE TO RELATED APPLICATIONS

This application is a 371 of PCT/IB04/02501 filed on Aug. 4, 2004.

BACKGROUND OF THE INVENTION

The present invention concerns metal laminates, in particular metal laminates that may undergo a subsequent forming step and cataphoresis step. It also concerns their use, notably for the manufacture of automotive body parts and in the construction sector.

Metal laminates comprise two outer metal sheets between which is interposed a polymer layer.

Generally, the main advantage of metal laminates with respect to metal sheets is that they allow the reduction of weight while meeting the specifications regarding stiffness. Such an advantage is particularly interesting in automotive applications since it contributes to a reduction of the fuel consumption of the vehicle.

Metal laminates, in particular those used for the manufacture of automotive body parts, have to meet severe requirements regarding the mechanical properties, both during forming and in service. The forming steps are in particular those of deep drawing, embossing, bending and hemming. The metal laminates should show good ductility at low temperatures in order to allow forming at these temperatures and ensure stiffness at the temperatures of service that is between −20 and 80° C.

The metal laminate should however also present a sufficient heat resistance (stiffness at high temperature) in order to allow high temperature treatments, in particular cataphoresis.

Further, the intermediate layer should have sufficient adhesive strength with respect to the outer metal layer so that the metal laminate presents the cohesion strength as required. For example, the specifications of the automotive industry require an adhesive strength, which is between 1 and 5 decaN/cm depending on the use of the piece.

Metal laminates with a polypropylene polymer layer are known, for example from EP 598 428. They are satisfactory in terms of rigidity and forming behaviour. However, these metal laminates do not present a satisfying heat resistance. Indeed, polypropylene has a melting temperature around 160° C., which is insufficient with regard to some subsequent treatment steps.

One of the frequent subsequent treatment steps for metal laminates is the painting by cataphoresis. Cataphoresis implies the exposure of the metal laminates to temperatures between 140 and 220° C. for 15 to 30 minutes in order to cure the applied coating layers.

The melting of the polymer at these temperatures leads to a drop in the tensile modulus of the layer, which is much lower than 0.01 MPa. The laminate then might sag under its own weight, yielding important geometrical deformations of the laminate. Further, the polymer might run and/or shrink at the extremities of the laminate, leading to unacceptable defects.

This problem is overcome by using an intermediate layer comprising a continuous woven fleece of thermoplastic polymer fibres impregnated with a thermoset polymer material. The thermoset polymer material also ensures adherence to the metal sheets. Such laminates present a good formability with a good heat resistance.

These laminates however present some drawbacks due to irregularities of the fleece thickness an, the adhesion to the metal sheets. Further, the microstructure of the textile fleece may be imprinted to the outer natural sheet during drawing. Such a surface appearance of laminate is incompatible with a use for the manufacture of automotive body parts.

Further to these drawbacks, the manufacturing process of these laminates is unsatisfactory because the adhesion step of the pre-impregnated fleece to the outer metal sheets is slow, leading to a low productivity.

The document U.S. Pat. No. 4,690,856 discloses metal laminates comprising an adhesive composition with improved adhesion strength. The composition comprises a polymer component and an aminosilane compound. The polymer component comprises a polyamide and a polyolefin grafted with an unsaturated polar moiety. However, such compositions tend to form a multi-block structure of polyamide—grafted polyolefin, which presents high viscosity and low tensile modulus, in particular at elevated temperatures. Further, the grafted groups tend to react with each other, thus blocking the reactive sites that are not available for reaction with the substrate. It is thus necessary to add aminosilanes to the polymer component, in order to obtain sufficient adhesive strength.

SUMMARY OF THE INVENTION

The aim of the present invention is hence to provide metal laminates that meet the above requirements while having a heat resistance and which show a good surface appearance after forming. Another aim is to provide metal laminates which may be used at temperatures between −20° C. and 220° C. A further aim of the present invention is to provide metal laminates that may be manufactured with a high productivity.

It has now been found that an intermediate polymer adhesive layer comprising a polyamide, a copolymer of ethylene and an unsaturated carboxylic acid, in particular a grafted polyethylene and a reactive copolymer could provide metal laminates solving the above problems.

DESCRIPTION OF THE INVENTION

In accordance with the present invention, there is provided a metal laminate comprising between two outer metal sheets an adhesive polymer layer comprising the above components.

In particular, it is provided a metal laminate comprising between two outer metal sheets an adhesive polymer layer obtainable by blending a polyamide, a copolymer of ethylene and an unsaturated carboxylic acid, in particular a grafted polyethylene and a reactive copolymer.

Under the term "metal laminate" is understood in the present invention a sandwich having at least two outer metal sheets and between the outer metal sheets at least one polymer layer.

Preferably, the intermediate polymer layer is homogeneous. However, it may be useful to use an inhomogeneous polymer layer. In that respect, it is in particular possible to use a polymer layer comprising two outer layers of one polymer material and one intermediate layer of another polymer material. Using this type of structure, it is possible to use for instance a polymer material with superior adhesive properties with respect to the metal for the outer polymer layers, while using another material having other advantageous properties, such as stiffness, for the inner polymer layer.

Generally, the outer metal sheets of the metal laminate will have the same surface dimensions. Such laminates are known in particular as sandwich sheets. However, it is also possible to prepare metal laminates according to the invention where the metal sheets do not have the same surface dimensions. Such laminates are known in particular as patchwork sheets. Patchwork sheets comprise a first metal sheet that is only locally reinforced by a second metal sheet fixed to the first sheet by an intermediate adhesive polymer layer. They are advantageous in that they allow an even further reduction of weight for pieces exposed only locally to high stress.

Hence, the present invention also encompasses metal laminates wherein the surface of the first outer metal sheet is greater than the surface of the second outer metal sheet.

The metal sheets of the metal laminate are preferably made of steel, although other metals such as aluminium, copper, nickel alloys and magnesium may also be contemplated for one or both of the outer metal sheets.

The grade of steel to be used depends mainly on the applications envisaged. In case the metal laminates are to be used for the manufacture of automotive parts, typical steel grades used are grade ES (EN DC 01 to DC06) and grade HLE (EN H 240 LA to H 400 LA).

The metal sheets used for the metal laminates will typically have a thickness of 0.1 mm to 3 mm.

The outer metal sheets of the metal laminate may be uncoated. Generally, they will however bear on one or both sides one or more coatings in order to improve their properties.

Such coatings may be produced for example by galvanisation or plating. These coatings include then in particular metallic alloys containing zinc, aluminium, tin or chromium.

Such coatings may also result from surface treatments such as phosphating, chromating, and alkaline oxidation. They thus include mineral compounds such as phosphor and chromium compounds.

Other coatings of the metal sheets may be based on organic compounds, such as primers, pre-paintings, pre-varnishes or finishes or other thin film coatings such as oils.

According to the invention, the adhesive polymer layer of the metal laminate comprises a polyamide, a grafted polyethylene and a reactive copolymer.

The adhesive polymer composition comprises preferably 20-95%, in particular 30-75% and especially 45-65% in weight of polyamide, based on the total composition.

Polyamides are polymers containing amide bonds (—CONH—), and they may be produced by:

(1) a ring-opening polymerisation of lactams;

(2) a condensation polymerisation of amino carboxylic acids; or (3) a condensation polymerisation of diamines and dibasic acids.

Examples of appropriate polyamides include polyamides formed from aliphatic, alicyclic or aromatic diamines such as hexamethylenediamide, decamtehylenediamine, dodecamethylenediamine, 2,2,4- or 2,4,4-trimethylhexamethylenediamine, 1,3- or 1,4-bis(aminomethyl)cyclohexane, bis (p-aminocyclohexylmethane), m- or p-xylylenediamine, etc., with aliphatic, alicyclic or aromatic dicarboxylic acids such as adipic acid, suberic acid, sebacic acid, cyclohexane dicarboxylic acids such as adipic, suberic acid, sebacic acid, cyclohexane dicarboxylic acid, terephtalic acid, isophthalic acid, etc.; polyamides formed from amino carboxylic acids such as 6-amino caproic acid, 11-amino undecanoic acid, 12-amino dodecanoic acid, etc.; polyamides formed from lactams such as epsilon-caprolactam, omega-dodecalactam etc.; copolymers made of these components; and mixture of these polyamides.

Specifically, the polyamide may be chosen from polyamide 6, polyamide 6.6, polyamide 11, polyamide 12, polyamide 4.6, polyamide 6.10, polyamide 6.12, polyamide 6 being particularly preferred.

Copolymers of polyamides such as those mentioned above are also intended to be covered by the term "polyamide". Preferred copolymers comprise however at least 50%, in particular 75% in weight of polyamide.

The melting point of the polyamide is preferably chosen to be at least the desired thermal resistance of the adhesive polymer composition.

Commercially available polyamides often contain 5-30 weight %, preferably 10-20% in weight of plasticisers. The addition of a plasticiser notably contributes to improve the impact resistance. Appropriate plasticisers, known in the art as such, are for instance epsilon-caprolactam, N-butylbenzene sulfonamide, or cetyl paraoxybenzoate.

According to the invention, the adhesive polymer composition further comprises a copolymer of ethylene and an unsaturated carboxylic acid, in particular a grafted polyethylene.

The copolymer of ethylene with an unsaturated carboxylic acid is preferably a bipolymer made of two different monomers. The preferred copolymer is a grafted copolymer wherein the polar groups are grafted onto the main chain polymer of ethylene. However, it is also possible that the copolymer is linear or branched, both monomers being distributed in a random, alternating, or periodic fashion. Further, the copolymer may also be a block copolymer.

The grafted polyethylene ensures a better adhesion of the polymer composition to the metal substrate. Further, the presence of the polyethylene component improves the behaviour of the polymer composition during forming due to the ductility of the polyethylene. Moreover, polyamides are generally at least partially crystalline and therefore tend to shrink upon solidification. This shrinkage is typically of some percent, in the case of polyamide 6 for example, it is of the order of 1.5-2%. The shrinkage is undesirable because it may lead to important deformations of the metal laminate. The elastomeric properties of the polyethylene component contribute to the absorption of the shrinking forces in the metal laminate.

Under the term "polyethylene" are understood polymers obtained by the polymerisation of ethylene. These may be linear or branched and include in particular ultra low density, very low density, low density, medium density and high density polyethylene.

Also covered by the term "polyethylene" are copolymers of ethylene with one or more additional polymerisable, unsaturated monomers. Examples of such copolymers include copolymers of ethylene and olefins, in particular alpha olefins such as propylene, butene, hexene or octene.

However, copolymers of ethylene and vinyl esters of linear or branched carboxylic acids having 1-24 carbon atoms such as ethylene-vinyl acetate copolymers, and copolymers of ethylene and acrylic or methacrylic esters of linear, branched or cyclic alkanols having 1-28 carbon atoms may also be useful. Examples of these copolymers include ethylene-alkyl (meth)acrylate copolymers, such as ethylene-methyl acrylate copolymers.

The choice of the polyethylene to be grafted will depend in part on the desired properties such as rigidity, density, or cristallinity. Indeed, these properties depend on the composition, molecular weight, polymerisation catalyst and polymerisation conditions of the polyethylene.

Preferably, the adhesive polymer composition comprises 5 to 80%, preferably 20 to 65%, and in particular 30 to 50% in weight of polyethylene grafted or to be grafted, based on the total composition.

According to a preferred embodiment, the composition comprises non-linear polyethylene, which inhibits crystallisation and thus contributes to further reduce shrinkage.

However, polyethylene as such does not have sufficient adhesive properties to ensure a satisfying cohesion between the polymer layer and the outer metal sheets.

In order to confer better adhesive properties to the polymer, the polyethylene is thus copolymerized, in particular grafted with polar moieties.

Under the term "polar moieties" are understood groups capable to react with the metal substrate in order to improve adhesion. Useful polar moieties are in particular obtained by reaction with unsaturated carboxylic acids, and/or a derivative thereof, such as the corresponding anhydrides and esters.

Suitable unsaturated carboxylic acids may contain 1 to 6 carboxylic acid groups, and include in particular maleic acid, fumaric acid, mesaconic acid, citraconic acid, aconitric acid and itaconic acid, 5-norbornene-2,3-dicarboxylic acid, 1,2,3,6-tetrahydrophthalic acid, acrylic acid and methacrylic acid, maleic acid being preferred.

Suitable esters include, for example, the esters derived from the above acids with alcohols having from 1 to 18 carbon atoms, including methanol, ethanol, propanol, isopropanol, butanol, sec. butanol, tert. butanol, decanol, 2-ethylhaxanol, and octadecanol.

The carboxylic groups of the acid may be totally or partially esterified.

Suitable esters include in particular methyl-, ethyl-, and dimethyl maleate, dimethyl fumarate, methyl ethyl maleate, dipropyl maleate, dibutyl maleate, methyl (meth)acrylate, 2-butyl (meth)acrylate, 2-ethylhexyl (meth)acrylate, decyl (meth)acrylate, octadecyl (meth)acrylate.

Grafting by reaction of the polyethylene with maleic acid anhydride is particularly preferred.

The polyethylene to be grafted may be reacted with 0.01 to 10%, preferably 0.1 to 1.5% in weight of the carboxylic acid and/or derivative thereof with respect to the total weight of the polymer composition. After the reaction, the excess carboxylic acid and/or derivative thereof is preferably eliminated from the composition.

The amount of grafting may be checked with an IR analysis.

The grafted polyethylene can be prepared by reacting the polyethylene with varying amounts of the unsaturated carboxylic acid, and/or a derivative thereof in presence of a catalyst such as a free radical initiator.

The choice of the free radical initiators used for grafting the polyethylene is not critical for the invention. For examples, any conventional radical initiators such as organic peroxo compounds and azonitriles may be used.

Examples of the organic peroxo compounds are alkyl peroxides such as diisopropyl peroxide, ditertiary butyl peroxide and tertiary butyl hydroperoxide; aryl peroxide such as dicumyl peroxide and cumyl hydroperoxide; acyl peroxide such as dilauryol peroxide; ketone peroxide such as methyl ethyl ketone peroxide and cyclohexanone peroxide. Examples of azonitriles are azo bisbutyronitrile and azobisisopropionitrile.

The presence of grafted polyethylene in the composition however tends to reduce the mechanical strength, in particular the tensile modulus, according to its concentration.

These properties however also depend on the phase structure of the composition. Generally, these properties are expected to be close to those of the component forming the continuous phase.

The phase structure formed in the composition depends on the relative quantities of the components, but also on their viscosity. Indeed, when mixing equal quantities of polymers with different viscosities, the low viscosity polymer generally forms the continuous phase while the high viscosity polymer forms the dispersed phase. Compositions with so-called "co-continuous phases" may also be obtained.

In order to minimize the effects of the presence of polyethylene on the mechanical properties, preferred polymer composition thus presents a polyamide continuous phase with polyethylene nodules.

According to the invention, the adhesive polymer composition further comprises a reactive copolymer.

The reactive copolymer has a double function. First, it enhances bonding by reaction with the substrate. It further contributes to control the viscosity of the polymer composition by reacting with the amine end groups of the polyamide, acting thus as some sort of "endcapping agent". Thereby, cross-linking by reaction between the grafted moieties of the polyethylene and the free amine end groups of the polyamide is limited.

Thereby, excess cross-linking increasing the viscosity of the composition is avoided and the formation of a polyamide continuous phase is favored. Also, adhesion due to unsaturated carboxylic acid and/or derivatives is improved by avoiding the blocking of the amine end groups of the polyamide by the unsaturated carboxylic acid and/or derivatives from the grafted polyethylene. The reactive polymer which has reacted with the amine end is thus available for reaction with the substrate, as the unsaturated carboxylic acid and/or derivatives.

However, some cross-linking is desirable because the formed copolymers, which present both a polyethylene and a polyamide chain, increase compatibility between polyamide and polyethylene.

The further addition of a reactive copolymer to the adhesive polymer composition thus leads to laminates that show very good adhesion properties along with excellent tensile modulus, even at elevated temperature, and thermal stability.

Preferred reactive copolymers are in particular copolymers of styrene and unsaturated carboxylic acids, and/or derivatives thereof, such as indicated above for the grafting of the polyethylene.

A particularly preferred copolymer is styrene-maleic acid anhydride (SMA).

These copolymers have been described, inter alia, in Encyclopedia of Polymer Science and Engineering Vol. 9 (1987), page 225 ff. These copolymers are commercially available in two types. One type comprises mostly high-molecular-weight copolymers (MW generally higher than 100,000 for instance, 1,000,000). These are in fact thermoplastics. The other type of SMA copolymers, on the other hand, which have a molecular weight in the range of about 1400 to about 50,000 and an anhydride content of more than 15% by weight, are pre-eminently suited to be used in the invention. Preference is also given to SMA copolymers having a molecular weight in the range of 1400 to 10,000. Examples of such copolymers include the commercially available SMA 1000, SMA 2xd000, SMA 3000, and SMA 4000. These copolymers have a styrene-maleic acid anhydride ratio of 1:1, 2:1, 3:1, and 4:1, respectively, and a molecular weight ranging from about 1400 to about 2000. Mixtures of these SMAs may also be used.

Preference is given to 0.5 to 10% of reactive copolymer with respect to the total weight of the composition, 1 to 6% of the total weight being particularly preferred.

The adhesive polymer composition preferably also contains an epoxy resin in order to improve the adhesion to the metal sheets.

Examples of such epoxy resins include phenol types such as those based on the diglycidyl ether of bisphenol A, on polyglycidyl ethers of phenol-formaldehyde novolac or cresol-formaldehyde novolac, on the triglycidyl ether of tris(p-hydroxyphenol)methane, or on the tetraglycidyl ether of tetraphenylethane; amine types such as those based on tetraglycidyl-methylenedianiline or on the triglycidyl ether of p-aminoglycol; cycloaliphatic types such as those based on 3,4-epoxycyclohexylmethyl-3,4-epoxycyclohexane carboxylate.

Preference is given to epoxy resins, which are derivatives of bisphenol A.

It should be noted that epoxy resins are generally represented by a single, unequivocal structural formula. The skilled person will know that this should be taken to include deviating products resulting from side reactions occurring during epoxy resin preparation. As these side products constitute a normal component of cured epoxy resins, they likewise constitute a normal component of the resins according to the invention.

Generally, the polymer composition contains 0.1 to 5%, in particular 1.5 to 2.5% of epoxy resin, based on the total weight of the composition.

While the reactive copolymer may act itself as a curing agent, the polymer composition may contain further curing agents for the resin, such as amines.

Any amine curing agents and hardeners well known in the art for curing epoxy resins may be used, in particular aromatic or aliphatic amines. Such amine polyalkyleneamines, amidoamines, polyamides, amine adducts and cyclic diamines such as isophorone diamine, m-xylylene diamine, and methylene biscyclohexaneamine or tertiary amines such as dimethyllaurylamine, dimethylstearylamine, N-butylmorpholine, N—N-dimethylcyclohexylamine, benzyldimethylamine, pyridine, dimethylamino-4-pyridine, methyl-1,6-hexanediamine, a mixture of tertiary amines with 16 to 18 carbons and known under the name of dimethylsulfamine. Further may also be used tertiary phosphines such as triphenylphosphine or zinc alkyldithiocarbamates.

Further to their action as a cross linking agent of the epoxy rein, these compounds can also act as a bonding agent to an oxidized and/or hydroxylized surface of the metal, through the formation of a chelate structure.

The adhesive polymer composition preferably comprises 0.05 to 20% in weight of curing agents with respect to the total weight.

In order to secure safety against fire, thermoplastic resins are often required to contain flame retardants so as to meet the standards of UL-94 V-0 or 5V (Underwriter's Laboratories Standard, U.S.A.). Various flame retardants have been developed and studied for this purpose.

Conventional flame retardants such as decabromodiphenyl ether, octabromodiphenyl ether, pentabromodiphenyl ether, 2,2-bis(3,5-dibromo-4-hydroxyphenol)propane, bis-(pentabromophenoxy)tetrabromobenzane may be added to the described composition in order to confer high-level flame retardancy. They are commonly used between 1 and 30% in weight with respect to the total weight of the composition.

Recent environmental concerns growing particularly in Europe have promoted the study on the use of halogen-free flame retardants, such as ATH (aluminum trihydroxide), magnesium dihydroxide or phosphorus type flame retardants such as organic phosphorous compounds and red phosphorus. These flame retardants may be added in a quantity of 10 to 60% with respect to the total weight of the polymer composition.

Further, the polymer composition may contain components well known in the art to further enhance the properties of the polymer composition.

For example, additives such as anti-static agents, pigments, colorants and the like can be incorporated into the polymer composition. Additionally, processing characteristics can be improved by incorporating lubricants or slip agents into the blends. All of these additives are generally used in relatively small amounts, usually less than 3% by weight with respect to the total polymer composition.

The polymer composition may be prepared according to conventional processes, which are known as such. In particular, the polymer composition may be prepared by mixing the components in an extruder followed by granulation.

The polyethylene can be grafted beforehand or else be grafted during the manufacture of the polymer composition. In the latter case, it is possible to monitor the properties of the composition during the grafting reaction and thereby to adapt the degree of grafting to the technical requirements of the envisaged application.

Preferably, the polyethylene component is however prepared separately, before mixing with the other components of the composition.

The grafting of the polyethylene may be prepared using a peroxide initiator in an extruder. The grafted polyethylene may then be granulated before compounding with the polyamide, preferably in presence of the reactive copolymer. This reaction may also conveniently be carried out in an extruder.

Subsequently, unreacted monomers may be eliminated from the polymer composition. This may be obtained for instance by melt devolatilisation. The polymer composition may then be granulated and, if necessary, dried before packaging.

The metal laminates according to the invention may be prepared by a process comprising the steps consisting in:
 a. Providing a first and a second metal sheet;
 b. Applying a polymer composition comprising polyamide, grafted polyethylene and a reactive copolymer onto the first metal sheet;
 c. Applying the second metal sheet onto the polymer layer applied onto the first metal sheet to obtain a metal laminate; and
 d. Heating the metal laminate to complete the adhesion.

Preferably, the polymer composition is previously extruded to form a polymer film. However, it is also possible to extrude the polymer film directly onto the first metal sheet, or to laminate the polymer film between the two metal sheets in one step.

The extrusion is preferably carried out using a mono screw extruder.

The thickness of the adhesive polymer film is preferably around 0.05 to 5 mm, preferably 0.2 to 1 mm.

The laminate is preferably exposed to a temperature of between 200 and 240° C. in order to complete the adhesion.

The metal laminates thus prepared are useful for example in the construction industry and in particular in the manufacture of automotive body parts such as hoods, roofs, doors, wings and rear doors.

The invention will be explained more in detail based on the following examples.

EXAMPLE 1: POLYMER LAYER ACCORDING TO THE INVENTION

A. Preparation of the Polyethylene Component

The polyethylene component was prepared by extruding with a double screw extruder, a mixture of 89 parts of ethylene based octene plastomer (Exact 8203, available from Exxon Mobil), 9.05 part of linear low-density polyethylene (Escorene LL 6101 RQ, available from Exxon Mobil), 1.5 parts of maleic acid anhydride, 0.15 parts of organic peroxide (Interox DHBP from SOVAY) and 0.3 part of antioxidant Irganox 1330 (available from Ciba Geigy).

The mixture was then subjected to melt devolatilisation, that is extrusion under vacuum in order to eliminate excess of maleic acid anhydride before granulation.

The extrudate is then granulated. The composition of the polyethylene component is resumed in Table 1 hereunder.

TABLE 1

| Composition of the polyethylene component | |
|---|---|
| | Parts per 100 |
| Ethylene based octane plastomer | 89 |
| LLDPE | 9.05 |
| Maleic acid anhydride | 1.5 |
| Organic peroxide | 0.15 |
| Antioxidant | 0.3 |

B. Preparation of the Adhesive Polymer Composition

The adhesive polymer composition was prepared by extruding in a double screw extruder 55.75 parts of polyamide PA6 (Ultramid B3 from BASF) with 40 parts of the grafted polyethylene component obtained according to the preceding section, 2 parts of microfine talc (talc Naintsch A3 from Naintsch), 0.15 parts of antioxidant (Irganox 1098 available from Ciba), and 0.1 parts of another antioxidant (Irgafos 168 available from Ciba).

To this mixture were added by way of a first side feeder 2 parts of styrene maleic acid anhydride copolymer (SMA 1000P from Atofina).

The extrudate was then subjected to melt devolatilisation, that is extrusion under vacuum in order to eliminate volatile components, and then subjected to granulation.

The obtained granules were dried at 70° C. for about 6 hours before storing away from moisture.

The composition is summarised in Table 2 hereunder.

The adhesive polymer composition presented a melt flow index at 275° C./49 N [measured according to the method of ASTD-1238] of 7 g/10 minutes.

The adhesive polymer composition was then extruded to form a film.

TABLE 2

| Composition of the adhesive polymer composition | |
|---|---|
| | Parts per 100 |
| PA 6 | 55.75 |
| Grafted Polyethylene | 40 |

TABLE 2-continued

| Composition of the adhesive polymer composition | |
|---|---|
| | Parts per 100 |
| Styrene maleic acid anhydride copolymer | 2 |
| Processing aid | 2 |
| Antioxidant | 0.15 |
| Antioxidant | 0.1 |

EXAMPLE 2: POLYMER PAYER ACCORDING TO THE PRIOR ART

The metal laminate comprising a polypropylene core is prepared by laminating a polypropylene film (Appryl 3020, MFI 1.9, density 0.905, available from Atofina) between two metal sheets, which were previously coated with a thin layer of an epoxy primer comprising grafted polypropylene.

The different adhesive polymer compositions were characterized by measuring the ductility and tensile modulus. The test procedures are described hereafter.

a. Ductility

The ductility of the polymer composition is measured using a standard elongation test (according to NF EN ISO 527).

The polymer film is cut into samples having a total length of 150 mm and a width of 20 mm at the extremities, the central part of a length of 80 mm having a width of 10 mm.

The sample is placed between the jaws of an elongation measuring apparatus INSTRON 45.05. The apparatus imparts a traction at a constant speed of 50 mm/min. The respective elongation of the sample at break indicates the ductility of the material.

The ductility is considered satisfying when it is at least equal to the ductility of steel, that is typically 40%.

b. Tensile Modulus at 220° C.

The tensile modulus indicates the stiffness of the polymer film. It is measured using a dynamic mechanical and thermal analysis apparatus (Rheometric MKII).

A sample of the polymer film of 4.75 cm×0.5 cm is inserted between the jaws of the apparatus. Then, a tensile stress is imparted to the sample, which is sufficiently low to ensure elastic deformation. The force opposed by the film to restore its initial form is measured. This test is repeated by cycles, generally of 1 Hz, while heating the sample at a rate of 2° C./min to measure the values for a temperature range of −50 to 250° C.

C. Preparation of the Laminate

The metal laminate was prepared by heat laminating an extruded film of the adhesive polymer composition onto the metal sheet made of an interstitial free titanium steel sheet which was subjected to a chromatation treatment (granodine 1415AD, available from Henkel) having a thickness of 0.25 mm at a temperature of 190° C.

D. Tests of the Metal Laminates

The obtained metal laminates were tested in order to determine the adhesion strength between the adhesive polymer layer and the outer metal sheets. Further, the laminates were subjected to a standard deep drawing test.

a. Adhesion Test

The adhesion between the adhesive polymer layer and the outer metal sheets was evaluated using a standard T peeling test (NF T 76112). This test was carried out as follows:

A sample of 250 mm×25 mm is cut out of the metal laminate. Each of the two outer metal sheets is inserted between the jaws of an apparatus for measuring the elongation (model 4505 from INSTRON) capable of measuring the force necessary for a predetermined displacement. The peeling force necessary for a displacement of the jaws at a constant speed of 100 mm/min is read on the apparatus.

b. Deep Drawing Test

A circular sample of the metal laminate having a diameter of 150 mm is mounted into a clamp ring having an internal diameter of 85 mm of an industrial press having a force of 0.8 MN. The force applied on the clamp ring is 80 kN.

A spherical punch with a diameter of 37.5 mm is applied to the center of the sample with a force of between 30 and 35 kN. The maximal penetration depth of the punch into the laminate before break is determined.

The laminate of the example presents a penetration depth before break identical to the one of the metal sheets alone.

The results of the tests of the polymer compositions and the metal laminates are resumed in Table 3 hereunder.

TABLE 3

Properties of the polymer compositions and the metal laminate

| Sample | Maximum elongation [%] | Tensile modulus at 200° C. [MPa] | Adhesion [daN/cm] | Deep drawing [mm] |
|---|---|---|---|---|
| Example 1 | 500 | 53 | 7 | As steel |
| Example 2* | 1000 | 0 | 10 | As steel |

*prior art

It follows from the results that a metal laminate according to the invention presents a heat resistance compatible with subsequent treatments such as cataphoresis combined with satisfactory adhesion properties and excellent tensile modulus, even at high temperature.

The properties of metal laminates according to the invention are thus very satisfactory and allow their use, notably in the automotive industry for the manufacture of automotive body parts, but also in other industries such as in particular construction.

The invention claimed is:

1. A metal laminate comprising between two outer metal sheets an adhesive polymer layer, characterized in that the adhesive polymer layer comprises a single polymer component, wherein the single polymer component consists of a polyamide, a copolymer of ethylene and an unsaturated carboxylic acid and/or a derivative thereof, a reactive copolymer comprising a styrene-maleic acid anhydride copolymer having a molecular weight of 1400 to 10,000, and an optional epoxy resin.

2. The metal laminate according to claim 1, wherein the surface dimensions of the first outer metal sheet is greater than the surface dimensions of the second outer metal sheet.

3. The metal laminate according to claim 1, wherein the outer metal sheets are made of steel or aluminum.

4. The metal laminate according to claim 1, wherein the polyamide comprises polyamide 6.

5. The metal laminate according to claim 1, wherein the adhesive polymer layer comprises 20 to 95% in weight of polyamide.

6. The metal laminate according to claim 5, wherein the adhesive polymer layer comprises 45 to 65% in weight of polyamide.

7. The metal laminate according to claim 1, wherein the copolymer of ethylene and an unsaturated carboxylic acid is a copolymer of ethylene and an unsaturated carboxylic acid containing 1 to 6 carboxylic groups and/or the derivative thereof.

8. The metal laminate according to claim 1, wherein the adhesive polymer layer comprises a polyamide continuous phase.

9. The metal laminate according to claim 1, wherein the adhesive polymer layer comprises 0.5 to 10% in weight of the reactive copolymer.

10. The metal laminate according to claim 1, wherein the adhesive polymer layer further comprises a flame retardant agent.

11. A metal laminate according to claim 1, wherein the adhesive polymer layer comprises 2 to 6% of styrene-maleic anhydride.

12. The metal laminate according to claim 1, wherein the copolymer of ethylene and an unsaturated carboxylic acid and/or a derivative thereof is a grafted polyethylene.

13. The metal laminate according to claim 12, wherein the grafted polyethylene is grafted with maleic acid and/or a derivative thereof.

14. The metal laminate according to claim 12, wherein the grafted polyethylene is grafted with maleic acid anhydride.

15. The metal laminate according to claim 12, wherein the adhesive polymer layer comprises 5 to 80% in weight of the grafted polyethylene.

16. The metal laminate according to claim 15, wherein the adhesive polymer layer comprises 30 to 50% in weight of the grafted polyethylene.

17. The metal laminate according to claim 12, wherein the grafted polyethylene nonlinear grafted polyethylene.

18. A process for the manufacture of a metal laminate according to claim 1 comprising the steps consisting in:

a. Providing a first and a second metal sheet;

b. Applying a polymer composition comprising a single polymer component, wherein the single polymer component consists of a polyamide, grafted polyethylene, a reactive copolymer onto the first metal sheet, wherein the reactive copolymer comprising a styrene-maleic acid anhydride copolymer having a molecular weight of 1400 to 10,000, and an optional epoxy resin;

c. Applying the second metal sheet onto the polymer layer applied onto the first metal sheet to obtain a metal laminate; and d. Heating the metal laminate to complete the adhesion.

19. The process according to claim 18, wherein the polymer composition is previously extruded to form a polymer film.

20. The process according to claim 18, wherein the polymer film is directly extruded onto the first metal sheet.

21. A method of manufacture of an automotive body part comprising molding the metal laminate of claim 1.

* * * * *